United States Patent [19] — Corradini et al.

[11] Patent Number: 4,931,325
[45] Date of Patent: Jun. 5, 1990

[54] MANUFACTURED ARTICLES BASED ON ISOTACTIC POLYPROPYLENE HAVING A HIGHLY ORIENTED STRUCTURE

[75] Inventors: Paolo Corradini; Claudio De Rosa; Gaetano Guerra; Luigi Nicolais; Vittorio Petraccone, all of Naples, Italy; Giancarlo Attalla, Rijswijk, Netherlands

[73] Assignee: Montedison S.p.A., Milan, Italy

[21] Appl. No.: 135,244

[22] Filed: Dec. 21, 1987

[30] Foreign Application Priority Data

Dec. 30, 1986 [IT] Italy ................................ 22885 A/86

[51] Int. Cl.$^5$ ............................................. B29D 22/00
[52] U.S. Cl. ................................... 428/35.7; 428/516; 428/910; 264/544; 526/348.2
[58] Field of Search ................................ 428/516, 910; 526/348.1, 348.2, 35.7

[56] References Cited

FOREIGN PATENT DOCUMENTS

| 1479921 | 3/1969 | Fed. Rep. of Germany | 428/910 |
| 156056 | 4/1980 | Japan | 428/910 |
| 6502691 | 9/1965 | Netherlands | 428/910 |
| 6502692 | 9/1965 | Netherlands | 428/910 |
| 1094480 | 12/1967 | United Kingdom | 428/910 |
| 2028232 | 3/1980 | United Kingdom | 428/910 |

Primary Examiner—Edith Buffalow
Attorney, Agent, or Firm—Stevens, Davis, Miller & Mosher

[57] ABSTRACT

This invention relates to composite manufactured articles formed by a set of uniaxially oriented isotatic polypropylene films, having a resistance to delamination of at least 0.4 kg/cm are prepared by heating under pressure a plurality of isotatic polypropylene films superimposed to each other and separated from each other by a non oriented polypropylene films. The oriented films show an orientation of the crystalline phase such as to produce X-ray scattering angles $\Delta X$ equal to or lower than 10°. The non oriented film show an orientation of the crystalline phase such as to produce X-ray scattering angles higher than 20°, at a temperature between a temperature equal to or higher than the melting temperature, measured in non restrain conditions, of the non oriented film and a temperature lower than the melting temperature, measured in restrained conditions, of the oriented films.

8 Claims, 3 Drawing Sheets

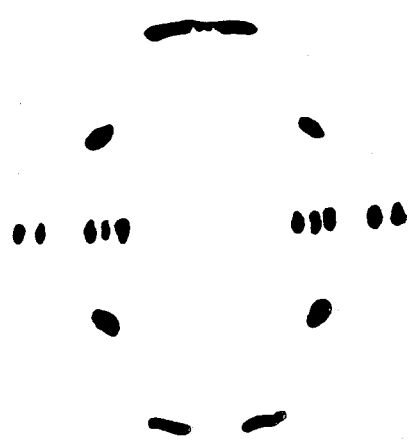
FIG. 2a
FIG. 2b
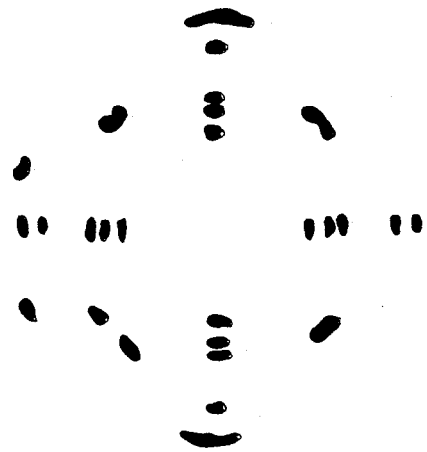
FIG. 2c

MANUFACTURED ARTICLES BASED ON ISOTACTIC POLYPROPYLENE HAVING A HIGHLY ORIENTED STRUCTURE

BACKGROUND OF THE INVENTION

It is known that film-forming polymers capable of orientation, such as isotactic polypropylene, can be transformed into manufactured items, such as sheets, tubes and shaped bodies in general, by thermoforming operations, such as by pressing, calendaring, extrusion, injection-pressing, vacuum forming, and the like.

The manufactured articles obtained by means of the above said procedures have mechanical and physical properties lower than those of the manufactured articles obtained from the same polymers and having a higly oriented structure, with consequent limitations in use.

To date, manufactured articles having a higly oriented structure, in the form of fibers and films, have been obtained by industrial processes.

In patent literature, high-thickness oriented manufactured articles are disclosed, by means of high-temperature compression of a set of oriented films.

According to British Specification No. 1316640, cross laminates of oriented olefin polymer films are obtained by extruding onto one of them a bonding film, and then laminating the assembly by applying pressure while the bonding film is molten and the oriented films are solid.

In this case, the bonding film can be a substantially unoriented stretchable polymeric material formed of the same monomers as those of the oriented films, but is different therefrom in that it has a lower melting point than the polymer of these latter films.

By such a method, composite products are obtained having an unsatisfactory resistance to delamination.

French patent No. 1478354 discloses the method for manufacturing laminated structures, which consists in subjecting to heat and pressure a composite formed of undirectionally oriented olefin polymer films, in the absence of any adhesive, at a temperature below the crystalline melting point.

A similar process, with the use of biaxially stretched films, is also described in French patent application No. 2055709.

By such methods, however, only films having a low degree of orientation of the crystalline phase, such as to give rise to X-ray scattering angles x higher than 10°, can be used with the result that composite structures characterized by low orientation degree, and consequently endowed with low modulus and other low tensile characteristics are obtained.

As a matter of fact, laminated structures formed of polypropylene films showing at the same time X-ray scattering angles not higher than 10°, and satisfactory resistance to delamination cannot be obtained from uniaxially oriented polypropylene films endowed with said scattering angles, by merely heating under pressure an assembly of same at a temperature lower than the crystalline melting point. In that case, only the use of bonding agents might ensure a sufficient adhesion between the films.

However the methods till now used involving the use of polymeric bonding agents have given rise to products endowed with not quite satisfactory resistence to delamination of the composite.

THE PRESENT INVENTION

The present invention relates to manufactured articles, such as plates, sheets, tubes, sandwich structures, and shaped bodies in general, formed by set of isotatic polypropylene films well cohering to each other, characterized by an orientation of the crystalline phase, for each layer, such to produce X-ray scattering angles ($\Delta x$) equal to, or lower than 10°.

The layers are considered to be "well cohering to each other" when the manufactured article, submitted to delamination tests, according to ASTM D 1866/72 Standard, shows a delamination strength at least equal to 0.4 kg/cm.

The orientation of the crystalline phase in a polymeric structure is generally evaluated by means of the X-ray diffraction technique. It is known that the X-ray diffraction patterns of "isotropic" crystalline or semi-crystalline polymeric materials are characterized by reflections, arranged as continuous-circle patterns.

When, on the contrary, in the material phenomena of preferential orientation of the crystalline fractions are present, the reflections may tend to totally or partially arrange themselves along arcs of a circle, or, in extreme cases, as true spots, due to particularly strong orientation phenomena. The dispersion of the intensity of an individual reflex along the circumference of the circle can be assumed as the qualitative index of the degree of preferential orientation of the material.

Let us take into consideration a spectrum obtained by delivering an X-ray beam perpendicularly to a layer of a manufactured article, or, possibly, to a set of plurality of layers well cohering to each other, as disclosed in the instant patent application. Let us carry out a photometry of the spectrum obtained at a constant angle $2\theta$, equal to 14° (Cu K $\alpha$), [corresponding to the lattice plane (110) of polypropylene], with varying azimuth angle X; on the photometric chart, the average value is read of the azimuth angle ranges ($\Delta x$) corresponding to the width, at half height, of the peak areas of the same reflex. As "peak zones", those regions of the photometric chart are defined, whose intensity, plotted as a function of x, is higher than the average value ($I_m$).

BRIEF DESCRIPTION OF THE DRAWINGS

FIG. 2a illustrates the X-ray diffraction spectrum corresponding to the photometric chart of 1a;

FIG. 2b illustrates the X-ray diffraction spectrum corresponding to the photometric chart of 1c;

FIG. 2c illustrates the X-ray diffraction spectrum corresponding to the photometric chart of 1b;

In FIG. 1, some photometric charts are schematically shown, which are obtained by varying x angles, with 20 being constant and equal to 14° (Cu K α), to evidence the definition and the evaluation of Δx parameter.

Figure 1A:
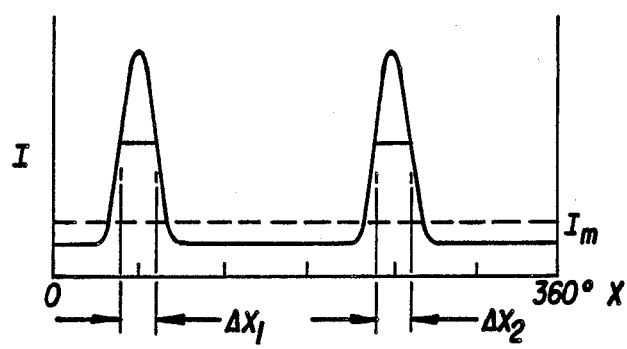
FIG. 1a illustrates a photometric chart corresponding to one embodiment of the invention.
Figure 1B:
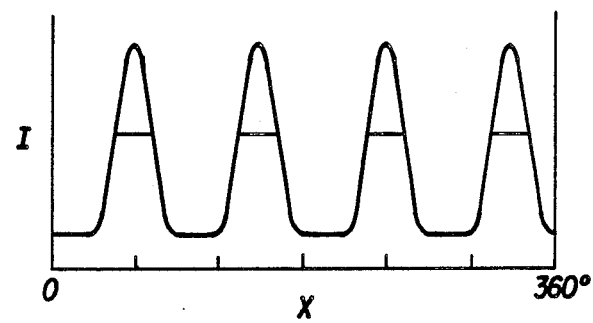
FIG. 1b illustrates a photometric chart corresponding to a second embodiment of the invention.

FIGS. 1a and 1b relate to value of $$\Delta x = \frac{\Delta x_1 + \Delta x_2}{2} \text{ and } \Delta x = \frac{\Delta x_1 + \Delta x_2 + \Delta x_3 + \Delta x_4}{4}$$

respectively.

One object of the present invention is to provide composite manufactured articles in the form of plates, sheets, tubes, and shaped bodies in general, having a highly oriented structure formed by a set of uniaxially oriented polypropylene films, each one being characterized by such an orientation of the crystalline phase, such to produce an X-ray scattering angle (Δx) equal to, or lower than 10°, and endowed with a resistence to delamination of at least 0.4 Kg/cm.

A further object of the present invention is the process for the manufacture of said composite articles which comprises the following operations:

1. A plurality of uniaxially oriented films of isotactic polypropylene, characterized by an orientation of the crystalline phase such as to produce an X-ray scattering angle (Δx) equal to, or lower than 10° are superimposed to each other, with interposed, between each other, at least one isotactic polypropylene film in an unoriented state or anyway characterized by x values larger than 20°;

2. The structure constituted by the set of superimposed films is submitted to a thermo-pressing treatment under pressures comprised within the range of from 10 to 100 Kg/cm², but preferably comprised between 20 and 60 Kg/cm², at temperatures comprised between a temperature equal to, or higher than melting temperature of the unoriented film measured in not-restrained conditions, and a temperature lower than the melting temperature of the oriented film measured in restrained conditions.

By melting temperature, it is meant here the temperature corresponding to the maximum of the melting endotherm measured at the DSC with a scanning rate comprised between 5° and 10° C./min.

The melting temperature in restrained conditions is commonly measured by keeping in a fixed condition the ends of the film, according to the procedure described by R. J. Samuels in L. Pol. Sci, Polym. Phys. Ed., 13, 1417 (1975).

The unoriented films are constituted by the same polymer of which the oriented films are made. In particular, as the nonoriented films, paracrystalline or smectic polypropylene films can be used.

The molecular weight of the polypropylene of which both the oriented and the non oriented films are made can be comprised between 200,000 and 700,000. The non-oriented film can be made of the same polypropylene as the oriented film, or of a polypropylene having a molecular weight different from the one of the oriented film.

Preferably, the working temperature is between a temperature which is about 5° C. higher than the melting temperature of the unoriented film in said nonrestrained conditions, and a temperature which is about 10° C. lower than the melting temperature of the oriented film in said restrained conditions. Still more preferred are temperatures between 165° and 175° C.

The thermo-pressing can be carried out without applying an external pressure in case of manufactured articles having a curved surface, and such to make possible the pressure resulting from the tensions generated by thermal shrinking of the individual films to be exploited, to obtain the compression and forming affect.

The superimposing of successive oriented films can be carried out in such a way that the orientation directions result crossed to each other.

Different numbers of films, whose thickness can vary within a wide range, are superimposed to each other, and thermo-pressed, as a function of the thickness which one desires to obtain in the manufactured article. In particular, laminated structures having any thickness under or above 0.3 mm can be easily obtained.

The preparation of the uniaxially oriented films to be used to produce the manufactured articles according to the present invention, can be carried out by any method usually employed in the art for uniaxially orienting crystalline polymer films.

Although the processes for orienting different materials for different purposes may vary in details, a simple basic stretching operation is the key step in the orientation process. A film of the polymeric material in a crystalline, oriented condition, after having been brought to an optimum temperature for orienting the crystals, is subjected to a stretching force which causes the crystallites to assume an oriented condition. The stretching force can be applied for instance by leading the free end of the undrawn film, which is wound around slowly rotating feed rollers, to more rapidly rotating pulling rollers which are positioned at some distance from the feed rollers, and winding said free end around said rapidly rotating rollers. The difference in velocity between the rollers will draw and stretch the length of the film lying between the rollers by about as many times as the value of the rapid rollers/slow rollers speed ratio.

In general, for the manufacture of uniaxially oriented polypropylene films endowed with values of Δx not higher than 10°, draw rates of at least 10, but preferably between 12 and 20 or more are used.

The present invention makes it possible to obtain manufactured items endowed with a high degree of orientation, which is about the same as that of the starting oriented films, and consequently endowed with high mechanical and tensile characteristics, such as elastic modulus, tensile and flexural strength, inpact and perforation strength, along with an outstanding resistance to delamination.

The oriented-structure manufactured articles prepared according to the present invention are directly used in the form of sheets, tubes, and the like, or they can be used as well in the production of other manufactured articles, such as, e.g., sandwich structures.

Thanks to their high mechanical properties, the manufactured articles according to the present invention yield very good performances as protective shields.

Some Examples follow, which illustrate the invention without anyway limiting it.

EXAMPLE 1

Highly oriented films of isotactic polypropylene (M.W.=250,000), having a thickness of 30μ, are used, characterized by an X-ray diffraction spectrum as reported in FIG. 2a, and by a Δx value approximately equal to 6°.

The photometric chart corresponding to the spectrum of FIG. 2a is shown in FIG. 1a. The melting temperature of said films, in restrained condition, is 189° C.

Figure 1C:
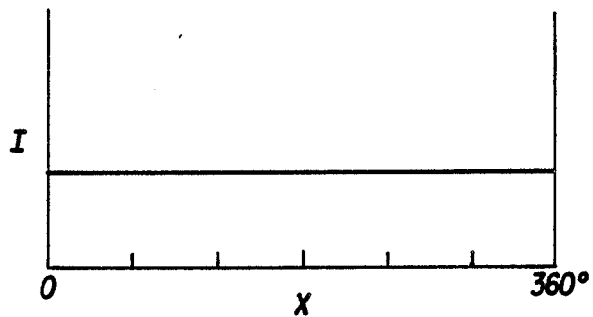
FIG. 1c illustrates a photometric chart corresponding to a third embodiment of the invention.

Furthermore, as non-oriented films, commercial paracrystalline films of isotactic polypropylene, (25-μ GT, manufactured by Moplefan Company) characterized by the X-ray diffraction pattern shown in FIG. 2b, ($\Delta \times \angle 20°$) are used. The photometric chart corresponding to the spectrum of FIG. 2b is shown in FIG. 1c. The melting temperature of said films, in non-restrained condition, is 160° C.

The characteristics of the oriented films, measured at room temperature and with a rate of separation of the clamps of 5 mm/min are as follows:

Eor1 = elastic modulus according to the orientation direction 1 = 13 GPa.

Eor2 = elastic modulus according to the direction ortogonal to the orientation direction = 1 GPa.

$\sigma$or1 = breaking load according to the orientation direction = 510 MPa.

$\sigma$or2 = breaking load according to the direction ortogonal to the orientation direction = 5 MPa.

The corresponding values of the non-oriented films are

Eo = 0.6 GPa and $\sigma$o = 30 MPa.

The two types of films are superimposed in an alternating sequence, such that the orientation direction of two successive oriented films are at 90° to each other, until a superimposed structure having a thickness of approximately 0.3 mm is obtained.

The structure, consisting of 92% by volume by oriented films and by 8% by volume by non oriented films is submitted to a pressing at 170° C. for approximately 1 min., under 50 Kg/cm², followed by cooling inside the process, to the temperature of 50° C.

The obtained slab shows, surprisingly, the X-ray diffraction pattern of FIG. 2c, and hence a highly oriented structure, as well as $\Delta$x value approximately equal to that of the films used as the starting materials. The photometric chart corresponding to the spectrum of FIG. 2c is reported in FIG. 1b. The strength to delamination tests of the manufactured item is of 0.5 kg/cm.

The elastic modulus EL1 = EL2 and breaking load L1 = L2 in the ortogonal directions 1 and 2 turn out to be 6.5 GPa and 239 MPa, respectively.

EXAMPLE 2

By using the same films and procedure as in Example 1 an assembly is prepared which is pressed a 165° C. under a pressure of 60 Kg/cm² during 10 minutes. A laminate is obtained having a thickness of 3.5 mm, and consisting of 44,2% by volume of oriented films having the orientation arranged in a direction 1, of 44,2% by volume of oriented films with the orientation in the thereto ortogonal direction 2, and of 11.6% by volume of non oriented film.

The resistence to delamination of the laminate is 0.6 Kg/cm. The characteristics of the laminate are:

EL1 = EL2 = 6.3 GPa; $\sigma$L1 = $\sigma$L2 = 225 MPa.

EXAMPLE 3

By using oriented polypropylene films (M.W. = 320,000) having a melting temperature in restrained conditions of 189.5° C. a thickness of 30μ, characterized by a $\Delta$x value of about 5°, and paracrystalline films of the same polypropylene, 20μ thick, and following the same procedure as in Example 1, an assembly is prepared which is then subjected to compression at 175° C. under 30 Kg/cm² pressure during 10 minutes.

A laminate 3.4 mm thick, consisting of 28.1 by volume of oriented films arranged with the orientation direction in a direction 1, 28.1% by volume of oriented films arranged with the orientation direction 2 in a direction ortogonal to direction 1, and 43.8% by volume of unoriented films, is obtained.

The characteristics of the laminate are:
EL1 = EL2 = 5.2 GPa; $\sigma$L1 = $\sigma$L2 = 147 MPa.
The resistance to delamination is 0.7 Kg/cm.

EXAMPLE 4

The oriented films, and the paracrystalline films are the same as those of Example 1. Differently form Example 1, the oriented films are all superimposed to each other with the same orientation, and the total thickness is of approximately 3 mm. The structure constituted by the superimposed films is submitted to pressing at 170° C. for approximately 10 minutes, under 50 Kg/cm², followed by cooling inside the press down to the temperature of 50° C.

A laminate consisting of 85% by volume of oriented films and 14% by volume of non-oriented films is obtained.

Its characteristics are:
EL1 = 11.5 GPa, $\sigma$L1 = 428 MPa.

Figure 3A:
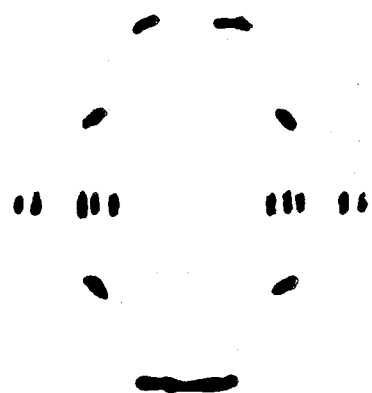
FIG. 3a illustrates an X-ray diffraction pattern of an embodiment of the invention after thermo-pressing.
Figure 3B:
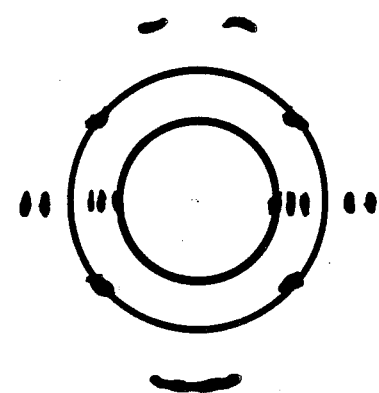
FIG. 3b illustrates an X-ray diffraction pattern of an embodiment of the invention before thermo-pressing.

The obtained slab shows the X-ray diffraction pattern of FIG. 3a, to be compared to the X-ray diffraction pattern shown by the superimposed-film structure before the thermo-pressing step (FIG. 3b). The photometric chart corresponding to the spectrum of FIG. 3a is shown in FIG. 1a. The strength to delamination tests of the manufactured article is of 0.8 Kg/cm.

EXAMPLE 5

The oriented films, and the paracrystalline films are the same as of Example 1. The oriented films and the paracrystalline films are alternatively wound on a cylinder, so to obtain a tube structure of 2 mm of thickness.

The structure is placed inside an oven at 165° C. for 5 minutes, and is then cooled to 50° C. In this case, no external pressure is applied, for the intended purpose the pressure resulting from the tensions of thermo-shrinking of the individual films being used. A piece cut from the so-obtained tube shows the X-ray diffraction spectrum reported in FIG. 4.

Figure 1D:
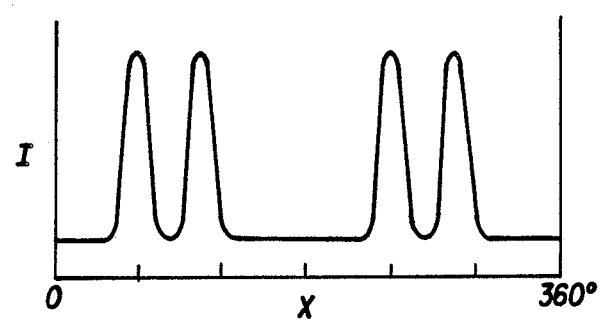
FIG. 1d illustrates a photometric chart corresponding to a fourth embodiment of the invention.
Figure 4:
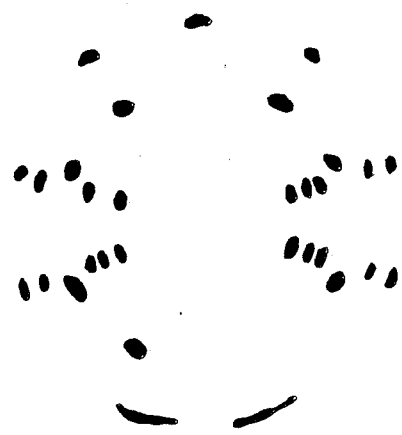
FIG. 4 illustrates the X-ray diffraction spectrum corresponding to the photometric chart of 1d.

The photometric chart corresponding to the spectrum of FIG. 4 is shown in FIG. 1d.

The resistence to delamination is 0.45 Kg/cm².

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What we claim is:

1. Multilayer thermoformed articles in the form of plates, sheets and tubes, consisting essentially of alternating superimposed layers made of uniaxially oriented polypropylene films and unoriented polypropylene films melt bonded to said uniaxially oriented films, said uniaxially oriented films having an orientation of their crystalline phase characterized by X-ray scattering angles ($\Delta$X) equal to or lower than 10° and said unoriented films having an X-ray scattering angle equal to or greater than 20°, said multilayer thermoformed article having on the whole a high orientation characterized by an X-ray scattering angle equal to or lower than 10° and a delamination strength of at least 0.4 kg/cm².

2. An article according to claim 1 wherein pairs of said uniaxially oriented films are separated by one or more of said unoriented films.

3. An article according to claim 2 wherein said pairs of uniaxially oriented films are arranged to as to be oriented in mutually perpendicular directions.

4. An article according to claim 2 wherein said pairs of uniaxially oriented films are arranged so as to be oriented in the same direction.

5. A multilayer thermoformed article in the form of plates, sheets and tubes having a high orientation characterized by an X-ray scattering angle equal to or lower than 10° and a delamination strength of at least 0.4 kg/cm$^2$, which has been prepared by superimposing alternating layers of uniaxially oriented polypropylene films having an X-ray scattering angle equal to or lower than 10° and of unoriented polypropylene films having an X-ray scattering angle equal to or greater than 20°, and melt bonding said superimposed alternating layers by heating under a pressure of from 10 to 100 kg/cm$^2$ at a temperature between the melting temperature, measured in unrestrained conditions, of the unoriented films and the melting temperature, measured in restrained conditions, of the oriented films.

6. A multilayer article according to claim 5 wherein in said preparation process said heating has been carried out at a temperature ranging from about 5° C. above said melting temperature of the unoriented films to about 10° C. below said melting temperature of the oriented films.

7. A multilayer article according to claim 5 wherein in said preparation process said pressure is an applied external pressure.

8. A multilayer article according to claim 5 wherein in said preparation process said pressure is generated by tensions developed during said thermoforming.

* * * * *